US012768489B2

(12) United States Patent
Abe et al.

(10) Patent No.: US 12,768,489 B2
(45) Date of Patent: Oct. 20, 2026

(54) OIL-WELL METAL PIPE

(71) Applicants: NIPPON STEEL CORPORATION, Tokyo (JP); VALLOUREC OIL AND GAS FRANCE, Aulnoye-Aymeries (FR)

(72) Inventors: Tomoka Abe, Tokyo (JP); Koji Akioka, Tokyo (JP); Mamoru Ochiai, Tokyo (JP); Yuichi Iwaki, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 97 days.

(21) Appl. No.: 18/992,005

(22) PCT Filed: Jul. 14, 2023

(86) PCT No.: PCT/JP2023/026134
§ 371 (c)(1),
(2) Date: Jan. 7, 2025

(87) PCT Pub. No.: WO2024/019019
PCT Pub. Date: Jan. 25, 2024

(65) Prior Publication Data

US 2026/0251256 A1 Aug. 27, 2026

(30) Foreign Application Priority Data

Jul. 20, 2022 (JP) ................................ 2022-115185

(51) Int. Cl.
*F16L 58/04* (2006.01)
*F16L 15/00* (2006.01)
*F16L 15/04* (2006.01)

(52) U.S. Cl.
CPC ............ *F16L 58/04* (2013.01); *F16L 15/004* (2013.01); *F16L 15/009* (2013.01); *F16L 15/04* (2013.01)

(58) Field of Classification Search
CPC ....... F16L 15/04; F16L 15/009; F16L 15/004; F16L 58/04; F16L 58/1027; F16L 58/1045; F16L 48/1072; E21B 17/042
See application file for complete search history.

(56) References Cited

U.S. PATENT DOCUMENTS

| | | | | |
|---|---|---|---|---|
| 8,322,754 | B2 * | 12/2012 | Carcagno ............ | F16L 58/1027 252/387 |
| 11,391,400 | B2 * | 7/2022 | Goto .................. | F16L 58/1054 |

(Continued)

FOREIGN PATENT DOCUMENTS

| | | | |
|---|---|---|---|
| JP | 2003021278 | A | 1/2003 |
| WO | 2006104251 | A1 | 10/2006 |

*Primary Examiner* — David Bochna
(74) *Attorney, Agent, or Firm* — Greer Burns & Crain Ltd.

(57) ABSTRACT

An oil-well metal pipe according to the present disclosure includes a resin coating formed as an uppermost layer on a pin contact surface and/or on a box contact surface. The resin coating contains: a base resin: 40.0 to 99.4 mass % in total, nylon: 0.1 to 20.0 mass %, $TiO_2$: 0.5 to 30.0 mass %, magnesium silicate hydroxide: 0 to 49.4 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, and a coupling agent: 0 to 10.0 mass %. In the resin coating, a ratio of the total content in mass % of the wax, the fluorine-based additive and the graphite to the total content in mass % of the $TiO_2$, the magnesium silicate hydroxide and the nylon is 5.00 or less.

4 Claims, 7 Drawing Sheets

(56) References Cited

U.S. PATENT DOCUMENTS

| | | | | |
|---|---|---|---|---|
| 12,510,191 | B2 * | 12/2025 | Abe ........................ | F16L 15/04 |
| 2024/0418301 | A1 * | 12/2024 | Abe ........................ | F16L 15/04 |

* cited by examiner

OIL-WELL METAL PIPE

TECHNICAL FIELD

The present disclosure relates to a metal pipe, and more specifically relates to an oil-well metal pipe.

BACKGROUND ART

An oil-well metal pipe is used in oil wells and gas wells (hereinafter, oil wells and gas wells are collectively referred to as simply "oil wells"). An oil-well metal pipe has a threaded connection (a pin or a box). At the oil well drilling site, in accordance with the depth of the oil well, a plurality of oil-well metal pipes are connected to form an oil country tubular goods connected body. Examples of an oil country tubular goods connected body include a casing pipe and a tubing pipe. An oil country tubular goods connected body is formed by connecting oil-well metal pipes to each other by fastening. Further, inspections are sometimes conducted on an oil country tubular goods connected body. When conducting an inspection, the oil country tubular goods connected body is lifted up and loosened. Oil-well metal pipes are then detached from the oil country tubular goods connected body by loosening, and inspected. After the inspection, the oil-well metal pipes are refastened to each other, and the oil-well metal pipes are used again as a part of the oil country tubular goods connected body.

An oil-well metal pipe includes a pin and a box. The pin has a pin contact surface including an external thread part on an outer peripheral surface of an end portion of the oil-well metal pipe. The box has a box contact surface including an internal thread part on an inner peripheral surface of an end portion of the oil-well metal pipe. In the present description, the external thread part and the internal thread part may also be collectively referred to as "thread parts". Note that, in some cases the pin contact surface may also include a pin unthreaded metal contact portion including a pin sealing surface and a pin shoulder surface. Likewise, in some cases the box contact surface may also include a box unthreaded metal contact portion including a box sealing surface and a box shoulder surface.

The pin contact surface and the box contact surface of the oil-well metal pipe repeatedly experience strong friction during fastening and loosening. Therefore, galling (unrepairable galling) is liable to occur at the pin contact surface and the box contact surface during repeated fastening and loosening. Accordingly, an oil-well metal pipe is required to have sufficient durability with respect to friction, that is, to have excellent galling resistance.

Heretofore, heavy metal powder-containing compound greases, which are referred to as "dopes", have been used to improve the galling resistance of an oil-well metal pipe. Application of a compound grease to the pin contact surface and/or the box contact surface can improve the galling resistance of an oil-well metal pipe. However, heavy metal powder contained in compound greases, such as Pb, Zn and Cu, may affect the environment. For this reason, the development of an oil-well metal pipe that is excellent in galling resistance even without the use of a compound grease is desired.

Technology for enhancing the galling resistance of an oil-well metal pipe is proposed in, for example, Japanese Patent Application Publication No. 2003-021278 (Patent Literature 1) and International Application Publication No. WO2006/104251 (Patent Literature 2).

Patent Literature 1 discloses an oil-well metal pipe that has a threaded connection, which is constituted by a pin and a box which each have a contact surface including a thread part and an unthreaded metal contact portion. In addition, the oil-well metal pipe has a solid lubricant coating composed of a solid lubricant and a binder on the contact surface of at least one of the pin and the box. In a cross section in the thickness direction of the solid lubricant coating, an area fraction of secondary particles having an equivalent area diameter within a range of 15 to 60 m of the solid lubricant is within a range of 5 to 90%. It is disclosed in Patent Literature 1 that according to this oil-well metal pipe, galling resistance and gastightness can be stably secured without applying a compound grease.

Patent Literature 2 discloses an oil-well metal pipe that has a threaded connection, which is constituted by a pin and a box which each include a contact surface having a thread part and an unthreaded metal contact portion. In addition, a contact surface of at least one member among the pin and the box has a viscous liquid or semisolid lubricant coating, and a dry solid coating that is formed on the lubricant coating. It is disclosed in Patent Literature 2 that according to this oil-well metal pipe, the occurrence of rust is suppressed and excellent galling resistance and gastightness are exhibited without using a compound grease.

CITATION LIST

Patent Literature

Patent Literature 1: Japanese Patent Application Publication No. 2003-021278
Patent Literature 2: International Application Publication No. WO2006/104251

SUMMARY OF INVENTION

Technical Problem

In this connection, a vertical wellbore that is drilled vertically or an inclined wellbore that is drilled in a direction that is inclined relative to the vertical direction is usually employed in drilling for oil and natural gas. On the other hand, horizontal drilling is one method of drilling for oil and natural gas. The term "horizontal drilling" refers to a method in which an oil well for which drilling proceeded vertically is gradually curved in the horizontal direction, and eventually is drilled horizontally along the storage reservoir of the oil or natural gas. In comparison to a usual vertical wellbore or inclined wellbore, a horizontal wellbore can contact a greater amount of a storage reservoir of oil or natural gas, and the amount of production of oil or natural gas per unit wellbore increases. In recent years, the use of horizontal drilling for oil and natural gas excavation is increasing. Accordingly, there is a demand for an oil-well metal pipe that can be used for an oil country tubular goods connected body which will assumedly be used for horizontal drilling.

In horizontal drilling, an oil country tubular goods connected body bends when the drilling direction changes from vertical to horizontal. At a horizontal drilling bend section, the drilling is advanced while causing the oil country tubular goods connected body to rotate in the pipe circumferential direction, to thereby cause the oil country tubular goods connected body to reach the target oil or natural gas storage reservoir. Therefore, particularly at a bent section of an oil country tubular goods connected body, torsion is applied to the oil-well metal pipes accompanying bending and rotation in the pipe circumferential direction of the oil country tubular goods connected body. If torsion is applied with a high load, oil-well metal pipes are liable to loosen. In a case where the drilling direction is the vertical direction, torsion in the pipe circumferential direction of the oil-well metal pipes is mainly applied to the oil-well metal pipes. However, in the case of horizontal drilling, in addition to torsion in the pipe circumferential direction of the oil-well metal pipes, torsion produced by bending of the oil-well metal pipes is also applied to the oil-well metal pipes. Therefore, in comparison to drilling in the vertical direction, in the case of horizontal drilling the oil-well metal pipes are subjected to the application of additional excessive torsion. Therefore, the oil-well metal pipes are more liable to loosen.

If oil-well metal pipes can be fastened with even higher torque than heretofore, it will be difficult for the oil-well metal pipes to loosen, even at a bent section of an oil country tubular goods connected body during horizontal drilling. Therefore, there is a need for an oil-well metal pipe which, in a case of being used for horizontal drilling, can be fastened with an even higher torque than heretofore.

An objective of the present disclosure is to provide an oil-well metal pipe in which the shear strength of a resin coating is increased.

Solution to Problem

An oil-well metal pipe according to the present disclosure includes:

a pipe main body including a first end portion and a second end portion, wherein:

the pipe main body includes:

a pin formed at the first end portion, and a box formed at the second end portion;

the pin includes:

a pin contact surface including an external thread part; and the box includes:

a box contact surface including an internal thread part;

the oil-well metal pipe further including:

a resin coating formed as an uppermost layer on the pin contact surface and/or on the box contact surface;

the resin coating containing:

a base resin of one or more types selected from a group consisting of epoxy resin, phenol resin, acrylic resin, urethane resin, polyester resin, polyamide-imide resin, polyimide resin, and polyether ether ketone resin: 40.0 to 99.4 mass % in total, nylon: 0.1 to 20.0 mass %, $TiO_2$: 0.5 to 30.0 mass %, magnesium silicate hydroxide: 0 to 49.4 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, and a coupling agent: 0 to 10.0 mass %;

wherein:

a ratio of a total content in mass % of the wax, the fluorine-based additive and the graphite to a total content in mass % of the nylon, the $TiO_2$ and the magnesium silicate hydroxide in the resin coating is 5.00 or less.

Advantageous Effect of Invention

The oil-well metal pipe of the present disclosure is excellent in shear strength of a resin coating.

DESCRIPTION OF EMBODIMENTS

Figure 1:
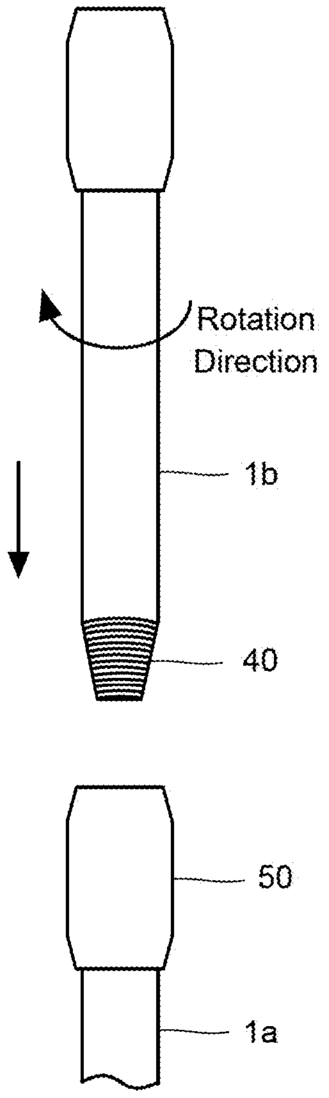
FIG. 1 is a schematic view of an oil-well metal pipe during fastening.

The present embodiment will be described in detail below with reference to the accompanying drawings. The same reference symbols will be used throughout the drawings to refer to the same or like parts, and description thereof will not be repeated.

The present inventors conducted studies regarding an oil-well metal pipe which can be applied to an oil country tubular goods connected body to be used for horizontal drilling, and which can be fastened with higher torque than conventional oil-well metal pipes. As a result, the present inventors obtained the following findings.

As described above, an oil country tubular goods connected body is formed by connecting oil-well metal pipes together by fastening. When fastening oil-well metal pipes together, the torque rises in accordance with the number of turns. In particular, in the final stage of fastening, the torque rapidly rises. On the other hand, if the torque during fastening becomes too high, in some cases the oil-well metal pipe will yield. In the present description, the torque at a time when an oil-well metal pipe yields when being fastened is also referred to as "yield torque". The higher the yield torque is, the higher the torque with which the oil-well metal pipe can be fastened will be. In other words, the yield torque can be used as an indicator of whether or not an oil-well metal pipe can be fastened with high torque.

Heretofore, a method which increases the coefficient of friction of a resin coating formed on an oil-well metal pipe has been proposed as means for increasing the fastening torque of an oil-well metal pipe. When fastening oil-well metal pipes together, if resin coatings that each have a high coefficient of friction come in contact and slide relative to each other, it is expected that the torque of the fastening will rise. Therefore, by increasing the coefficient of friction of the resin coating, there is a possibility that the yield torque will be increased. Therefore, the present inventors included a magnesium silicate hydroxide that is a solid powder and/or $TiO_2$ that is a solid powder in a resin coating, adjusted the coefficient of friction of the resin coating, and investigated the relation between the coefficient of friction and the yield torque. However, contrary to the expectation of the present inventors, it was revealed that the correlation between the coefficient of friction and the yield torque is weak. The result of the investigation conducted by the present inventors revealed that the yield torque cannot be effectively raised by simply increasing the coefficient of friction of the resin coating.

Therefore, the present inventors conducted further studies regarding an oil-well metal pipe that can be fastened with high torque. First, the present inventors focused their attention on the behavior of a resin coating in the final stage of fastening. In the final stage of fastening, resin coatings come in contact with each other with a high interfacial pressure, and slide in the pipe circumferential direction of the oil-well metal pipes.

FIG. 1 is a schematic view of an oil-well metal pipe during fastening. Referring to FIG. 1, fastening is performed, for example, by the following method. An oil-well metal pipe 1*a* is fixed. A pin 40 of an oil-well metal pipe 1*b* is inserted into a box 50 of the fixed oil-well metal pipe Ta. The inserted oil-well metal pipe 1*b* is rotated in the pipe circumferential direction of the oil-well metal pipe 1*b*.

Figure 2:
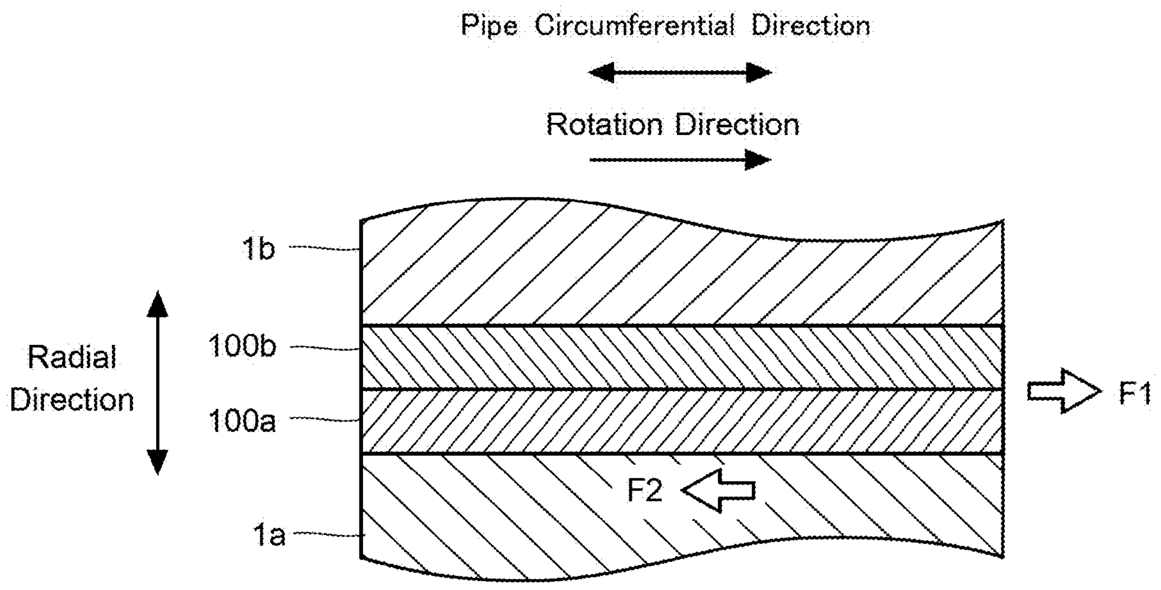
FIG. 2 is a cross-sectional view perpendicular to the pipe axis direction of oil-well metal pipes, illustrating the vicinity of resin coatings during fastening.

FIG. 2 is a cross-sectional view perpendicular to the pipe axis direction of the oil-well metal pipes, illustrating the vicinity of resin coatings during fastening. A case is assumed in which the oil-well metal pipe T a is fixed, and the oil-well metal pipe 1*b* is fastened thereto while rotating the oil-well metal pipe 1*b* in the pipe circumferential direction. Here, a face on a resin coating 100*b* side of a resin coating 100*a* is referred to as "front face". A face on the oil-well metal pipe 1*a* side of the resin coating 100*a* is referred to as "rear face". Referring to FIG. 2, when the oil-well metal pipe 1*b* is rotated in the pipe circumferential direction to perform fastening to the oil-well metal pipe 1*a*, in the resin coating 100*b* formed on the oil-well metal pipe 1*b*, a propulsive force F1 arises in the same direction as the direction of rotation of the oil-well metal pipe 1*b*. In the final stage of fastening, an interfacial pressure that presses the resin coating 100*a* and the resin coating 100*b* in the radial directions of the oil-well metal pipes 1*a* and 1*b* is high. When fastening is performed under a high interfacial pressure, the resin coating 100*a* slides in a state in which the resin coating 100*a* is strongly pressed against the resin coating 100*b*. Therefore, a propulsive force F1 in the same direction as the direction of rotation of the oil-well metal pipe 1*b* arises in the resin coating 100*a* also. Because the resin coating 100*a* is fixed onto the surface of the oil-well metal pipe 1*a*, a force F2 in the opposite direction to the propulsive force F1 arises at the rear face of the resin coating 100*a*. That is, in the final stage of fastening, forces in opposite directions to each other with respect to the pipe circumferential direction of the oil-well metal pipe 1 are applied at the front face and the rear face of the resin coating 100*a*. The same applies with respect to the resin coating 100*b*, that is, in the final stage of fastening, forces in opposite directions to each other with respect to the pipe circumferential direction of the oil-well metal pipe 1 are applied at the front face and the rear face of the resin coating 100*b*.

Forces whose sizes are equal and which act in opposite directions on two parallel planes within an object are referred to as shear forces. It is considered that, if the shear strength of the resin coating 100 is high, even if sliding occurs between the front face and rear face of the resin coating 100 due to fastening, it will be difficult for deformation or damage to occur, and the sliding resistance will also be large. If the resin coating 100 is deformed or damaged under low torque, the number of turns of the oil-well metal pipe 1 will rise while the torque is still low. In this case, the yield torque cannot be increased. On the other hand, it is considered that, during fastening, if deformation and damage of the resin coating 100 are suppressed and the sliding resistance is high, until the final stage of fastening the resin coating 100 can be maintained in a shape which is close to the shape thereof prior to the fastening, and torque can also be increased. It is considered that in this case, it is possible to obtain high torque with respect to the number of turns of the oil-well metal pipe 1. That is, it is considered that by increasing the shear strength of the resin coating 100, the yield torque increases.

Figure 3:
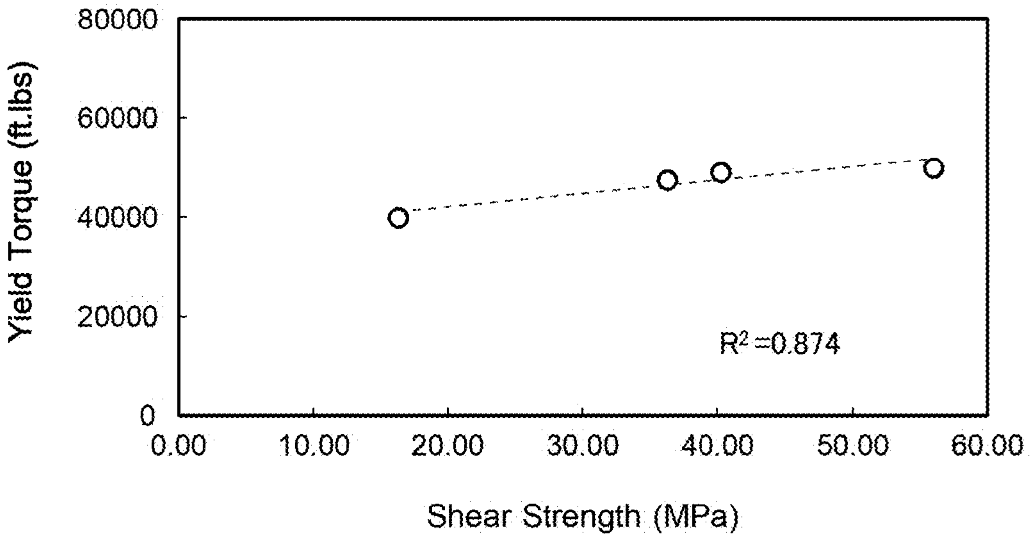
FIG. 3 is a view illustrating the relation between the shear strength of a resin coating and yield torque.

The present inventors studied in detail the relation between the shear strength of a resin coating and the yield torque of oil-well metal pipes. FIG. 3 is a view illustrating the relation between the shear strength of a resin coating and yield torque. The abscissa in FIG. 3 represents the shear strength (MPa) of the resin coating. The ordinate in FIG. 3 represents the yield torque (ft. lbs.) in a case where an oil-well metal pipe on which the resin coating was formed was fastened.

Referring to FIG. 3, a correlation coefficient $R^2$ between the shear strength of the resin coating and the yield torque was 0.874. Based on this result, a strong positive correlation is recognized between the shear strength of the resin coating and the yield torque. That is, the result of the detailed studies of the present inventors revealed that if the shear strength of the resin coating is increased, the yield torque of the oil-well metal pipe is effectively raised.

The present inventors conducted studies with respect to means for increasing the shear strength of the resin coating 100. The present inventors focused their attention on hydrogen bonds and electrostatic interactions in the resin coating 100. Hydrogen bonds and electrostatic interactions are hereinafter referred to as "attractive interactions". When there are many attractive interactions in the resin coating 100, it is necessary to cut a greater number of attractive interactions in order to deform and damage the resin coating 100. The present inventors considered that the shear strength of the resin coating 100 can be increased by increasing the attractive interactions in the resin coating 100.

The present inventors conducted studies regarding means for increasing attractive interactions in the resin coating 100. As a result, the present inventors discovered that if nylon is contained in the resin coating 100, there is a possibility that attractive interactions in the resin coating 100 will increase.

Nylon is a generic designation for polymers having a structure in which units including amide bonds (CONH) and hydrocarbon ($CH_2$) are repeated. Hydrogen (H) included in the amide bonds form hydrogen bonds with other elements. Therefore, it is considered that if the resin coating 100 contains a base resin having functional groups which form hydrogen bonds with hydrogen included in amide bonds, and nylon, hydrogen bonds will increase and attractive interactions will increase. The present inventors conducted further studies, and as a result, considered that if the resin coating 100 contains a base resin of one or more types selected from the group consisting of epoxy resin, phenol resin, acrylic resin, urethane resin, polyester resin, polyamide-imide resin, polyimide resin, and polyether ether ketone resin in a total amount of 40.0 to 99.4 mass %, and nylon in an amount of 0.1 to 20.0 mass %, attractive interactions of the resin coating 100 can be increased.

However, in the case of the resin coating 100 having the aforementioned composition, the shear strength of the resin coating 100 could not necessarily be increased. Therefore, the present inventors conducted more detailed studies regarding the composition of the resin coating 100. As a result, the present inventors discovered that if the resin coating 100 has the aforementioned composition, and in addition, a ratio of a total content in mass % of a wax, a fluorine-based additive and graphite to a total content in mass % of $TiO_2$, magnesium silicate hydroxide and nylon is 5.00 or less, the shear strength of the resin coating 100 increases.

Figure 4:
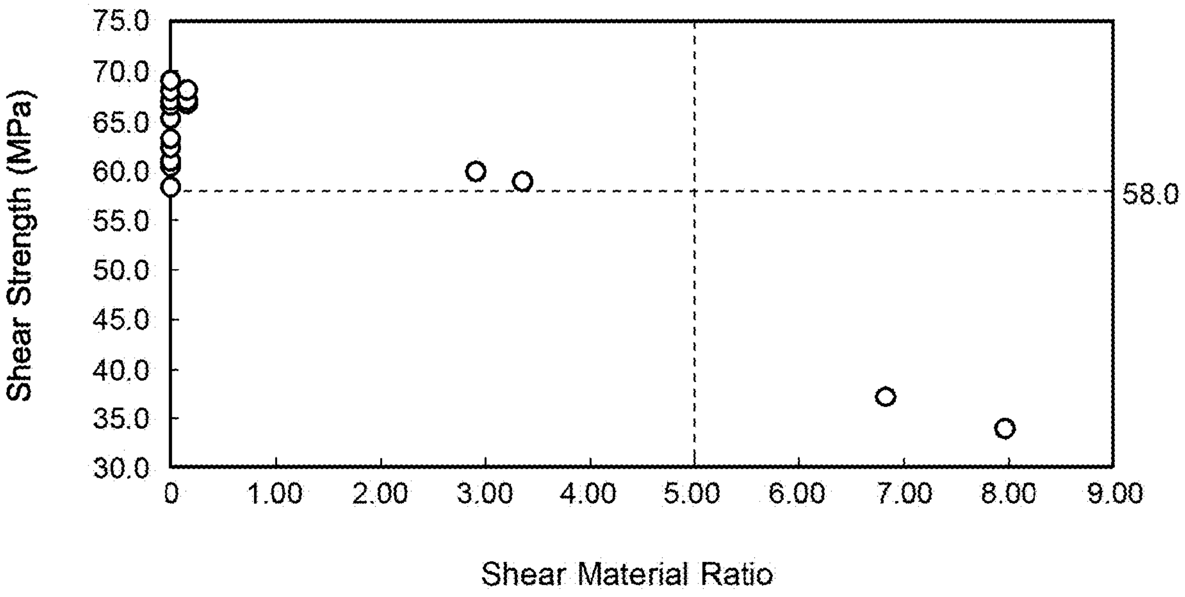
FIG. 4 is a view illustrating the relation between a shear material ratio in a resin coating and the shear strength of the resin coating.

The ratio of the total content in mass % of a wax, a fluorine-based additive and graphite to the total content in mass % of $TiO_2$, magnesium silicate hydroxide and nylon is defined as a "shear material ratio". FIG. 4 is a view illustrating the relation between the shear material ratio in the resin coating 100 and the shear strength of the resin coating 100. FIG. 4 is an extract of one part of the results of examples which are described later. The abscissa in FIG. 4 represents the shear material ratio. The ordinate in FIG. 4 represents the shear strength (MPa) of the resin coating 100. Referring to FIG. 4, when the shear material ratio is 5.00 or less, the shear strength of the resin coating 100 becomes 58.0 MPa or more.

A wax, a fluorine-based additive, and graphite are added for the purpose of lowering the coefficient of friction of the resin coating 100. However, a wax, a fluorine-based additive, and graphite fundamentally do not have a functional group that forms hydrogen bonds with hydrogen within amide bonds. Therefore, it is considered that a wax, a fluorine-based additive, and graphite do not contribute to an increase in shear force caused by increasing attractive interactions. It is considered that if the content of a wax, a fluorine-based additive, and graphite is too large with respect to nylon, attractive interactions will not sufficiently increase and the shear strength of the resin coating 100 will not be raised. It is considered that $TiO_2$ and magnesium silicate hydroxide themselves have a high shear strength. Therefore, it is considered that if the content of nylon, $TiO_2$ and magnesium silicate hydroxide is large, the shear strength of the resin coating 100 will be increased.

Thus, in contrast to the conventional findings, it was revealed that the yield torque cannot be effectively raised by simply increasing the coefficient of friction of a resin coating, and that the yield torque is effectively raised only after the shear strength of the resin coating is increased. In addition, it was revealed that the shear strength of the resin coating is increased only when each component in the resin coating is adjusted as described above. By increasing the shear strength of the resin coating to raise the yield torque, an oil-well metal pipe that can also be used for horizontal drilling is obtained. The oil-well metal pipe of the present disclosure was completed based on the above findings, and has the following structure.

[1]

An oil-well metal pipe including:

a pipe main body including a first end portion and a second end portion, wherein:

the pipe main body includes:

a pin formed at the first end portion, and a box formed at the second end portion;

the pin includes:

a pin contact surface including an external thread part; and the box includes:

a box contact surface including an internal thread part;

the oil-well metal pipe further including:

a resin coating formed as an uppermost layer on the pin contact surface and/or on the box contact surface;

the resin coating containing:

a base resin of one or more types selected from a group consisting of epoxy resin, phenol resin, acrylic resin, urethane resin, polyester resin, polyamide-imide resin, polyimide resin, and polyether ether ketone resin: 40.0 to 99.4 mass % in total, nylon: 0.1 to 20.0 mass %, $TiO_2$: 0.5 to 30.0 mass %, magnesium silicate hydroxide: 0 to 49.4 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, and a coupling agent: 0 to 10.0 mass %;

wherein:

a ratio of a total content in mass % of the wax, the fluorine-based additive and the graphite to a total content in mass % of the nylon, the $TiO_2$ and the magnesium silicate hydroxide in the resin coating is 5.00 or less.

[2]

The oil-well metal pipe according to [1], wherein:

a ratio of a content in mass % of the nylon to a total content in mass % of the base resin is 0.30 or less.

[3]

The oil-well metal pipe according to [1] or [2], wherein:

the pin contact surface further includes a pin sealing surface and a pin shoulder surface, and the box contact surface further includes a box sealing surface and a box shoulder surface.

Hereunder, the oil-well metal pipe according to the present embodiment will be described in detail.

[Structure of Oil-Well Metal Pipe]

First, the structure of the oil-well metal pipe of the present embodiment will be described. The oil-well metal pipe has a well-known structure. The available types of oil-well metal pipe are a T&C type oil-well metal pipe and an integral type oil-well metal pipe. Hereunder, each type of oil-well metal pipe will be described in detail.

[Case where Oil-Well Metal Pipe 1 is T&C Type]

Figure 5:
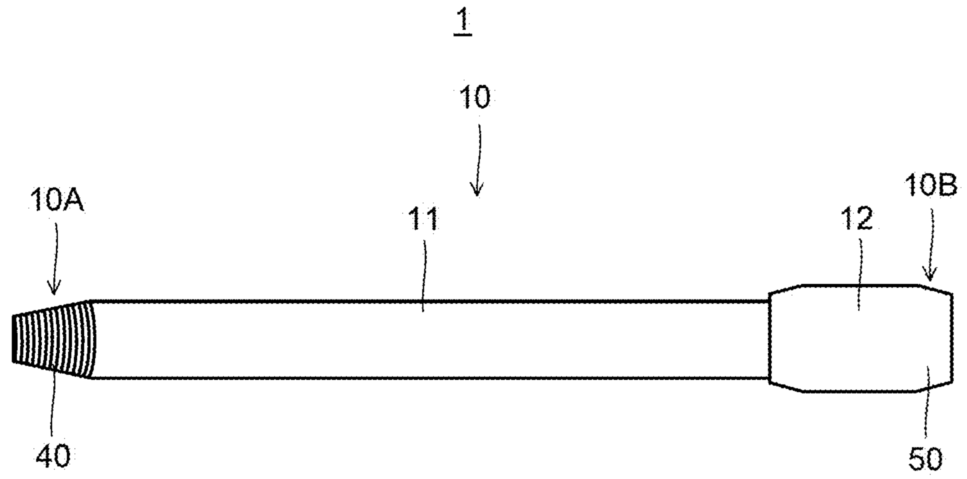
FIG. 5 is a configuration diagram illustrating a T&C (threaded and coupled) type oil-well metal pipe according to the present embodiment.

FIG. 5 is a configuration diagram illustrating one example of an oil-well metal pipe 1 according to the present embodiment. FIG. 5 is a configuration diagram illustrating the oil-well metal pipe 1 of a so-called T&C type. Referring to FIG. 5, the oil-well metal pipe 1 includes a pipe main body 10.

The pipe main body 10 extends in the pipe axis direction. A cross section perpendicular to the pipe axis direction of the pipe main body 10 is a circular shape. The pipe main body 10 includes a first end portion 10A and a second end portion 10B. The first end portion 10A is an end portion on the opposite side to the second end portion 10B. In the T&C type oil-well metal pipe 1 illustrated in FIG. 5, the pipe main body 10 includes a pin tube body 11 and a coupling 12. The coupling 12 is attached to one end of the pin tube body 11. More specifically, the coupling 12 is fastened by threading to one end of the pin tube body 11.

Figure 6:
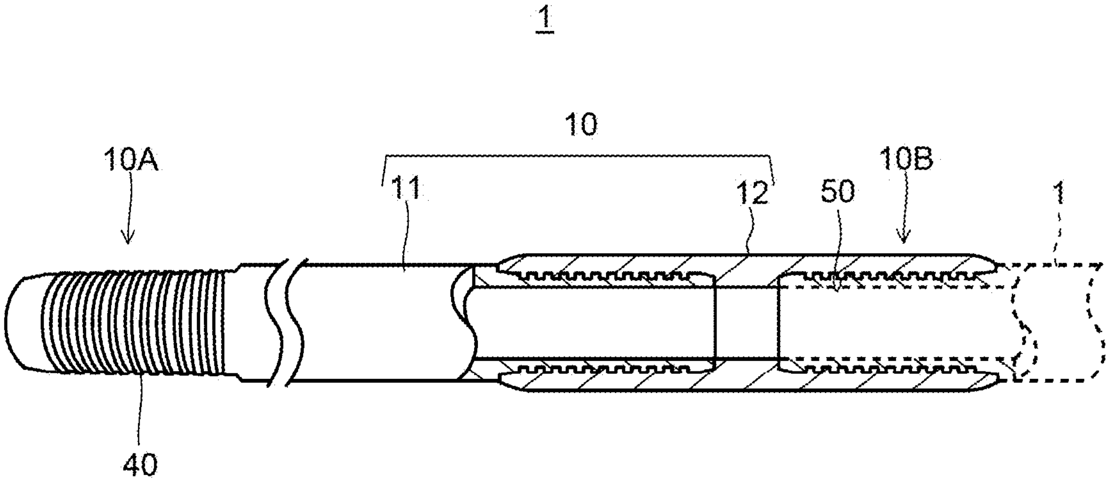
FIG. 6 is a partial cross-sectional view illustrating a cross section (longitudinal cross section) parallel to a pipe axis direction of a coupling of the oil-well metal pipe illustrated in FIG. 5.

FIG. 6 is a partial cross-sectional view illustrating a cross section (longitudinal cross section) that is parallel to the pipe axis direction of the coupling 12 of the oil-well metal pipe 1 illustrated in FIG. 5. Referring to FIG. 5 and FIG. 6, the pipe main body 10 includes a pin 40 and a box 50. The pin 40 is formed at the first end portion 10A of the pipe main body 10. When performing fastening, the pin 40 is inserted into the box 50 of another oil-well metal pipe 1 (not illustrated), and is fastened by threading to the box 50 of the other oil-well metal pipe 1.

The box 50 is formed at the second end portion 10B of the pipe main body 10. When performing fastening, the pin 40 of another oil-well metal pipe 1 is inserted into the box 50, and the box 50 is fastened by threading to the pin 40 of the other oil-well metal pipe 1.

[Regarding Structure of Pin 40]

Figure 7:
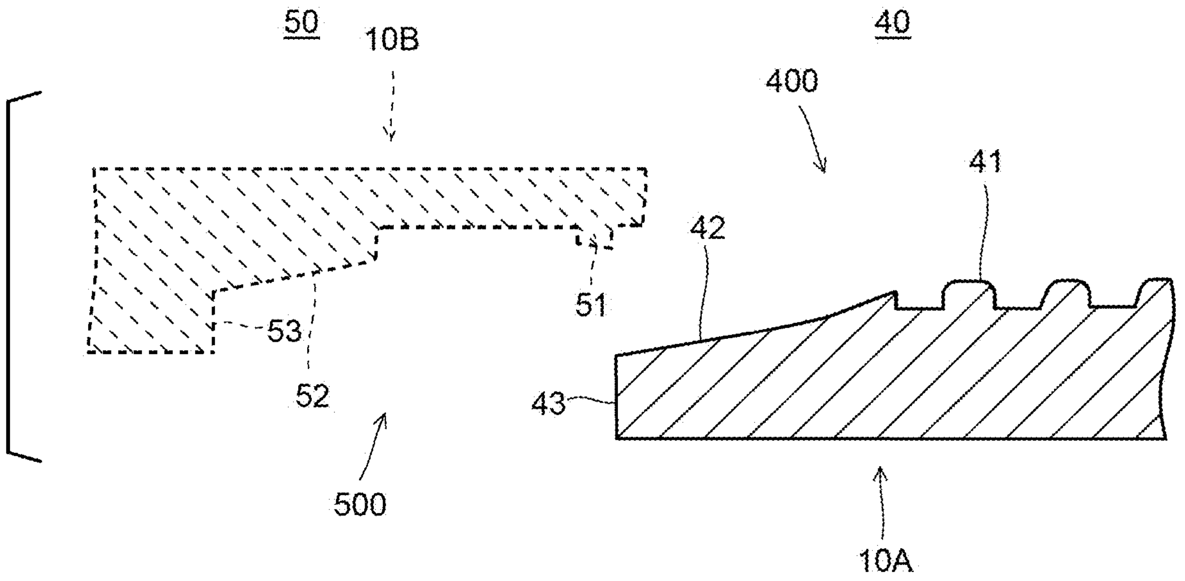
FIG. 7 is a cross-sectional view parallel to the pipe axis direction of the oil-well metal pipe illustrated in FIG. 6, illustrating a portion in the vicinity of a pin of the oil-well metal pipe.

FIG. 7 is a cross-sectional view of a portion in the vicinity of the pin 40 of the oil-well metal pipe 1 illustrated in FIG. 6, that is a cross-sectional view parallel to the pipe axis direction of the oil-well metal pipe 1. A dashed line portion in FIG. 7 represents the structure of the box 50 of another oil-well metal pipe in the case of fastening the oil-well metal pipe 1 to another oil country tubular good with a threaded connection 1. Referring to FIG. 7, the pin 40 includes a pin contact surface 400 on the outer peripheral surface of the first end portion TOA of the pipe main body 10. When fastening to the other oil-well metal pipe 1, the pin contact surface 400 is screwed into the box 50 of the other oil-well metal pipe 1 and contacts a box contact surface 500 (described later) of the box 50.

The pin contact surface 400 includes at least an external thread part 41 formed in the outer peripheral surface of the first end portion 10A. The pin contact surface 400 may further include a pin sealing surface 42 and a pin shoulder surface 43. In FIG. 7, the pin shoulder surface 43 is disposed at the front end face of the first end portion 10A, and on the outer peripheral surface of the first end portion 10A, the pin sealing surface 42 is disposed further on the front end side of the first end portion 10A than the external thread part 41. In other words, the pin sealing surface 42 is disposed between the external thread part 41 and the pin shoulder surface 43. The pin sealing surface 42 is provided in a tapered shape. Specifically, the external diameter of the pin sealing surface 42 gradually decreases from the external thread part 41 toward the pin shoulder surface 43 in the longitudinal direction (pipe axis direction) of the first end portion 10A.

When performing fastening with another oil-well metal pipe 1, the pin sealing surface 42 contacts a box sealing surface 52 (described later) of the box 50 of the other oil-well metal pipe 1. More specifically, during fastening, when the pin 40 is inserted into the box 50 of the other oil-well metal pipe 1, the pin sealing surface 42 contacts the box sealing surface 52. Subsequently, when the pin 40 is screwed further into the box 50 of the other oil-well metal pipe 1, the pin sealing surface 42 closely contacts the box sealing surface 52. By this means, during fastening, the pin sealing surface 42 closely contacts the box sealing surface 52 to thereby form a seal that is based on metal-to-metal contact. Therefore, the gastightness can be increased in each of the oil-well metal pipe 1 that are fastened to each other.

In FIG. 7, the pin shoulder surface 43 is disposed at the front end face of the first end portion 10A. In other words, in the pin 40 illustrated in FIG. 7, the external thread part 41, the pin sealing surface 42 and the pin shoulder surface 43 are disposed sequentially in that order from the center of the pipe main body 10 toward the first end portion 10A. During fastening to the other oil-well metal pipe 1, the pin shoulder surface 43 opposes and contacts a box shoulder surface 53 (described later) of the box 50 of the other oil-well metal pipe 1. More specifically, during fastening, the pin shoulder surface 43 contacts the box shoulder surface 53 as a result of the pin 40 being inserted into the box 50 of the other oil-well metal pipe 1. By this means, during fastening, a high torque can be obtained. Further, the positional relation between the pin 40 and the box 50 in the fastening state can be stabilized.

Note that, the pin contact surface 400 of the pin 40 includes at least the external thread part 41. In other words, the pin contact surface 400 includes the external thread part 41, and need not include the pin sealing surface 42 and the pin shoulder surface 43. The pin contact surface 400 may include the external thread part 41 and the pin shoulder surface 43, and need not include the pin sealing surface 42. The pin contact surface 400 may include the external thread part 41 and the pin sealing surface 42, and need not include the pin shoulder surface 43.

[Regarding Structure of Box 50]

Figure 8:
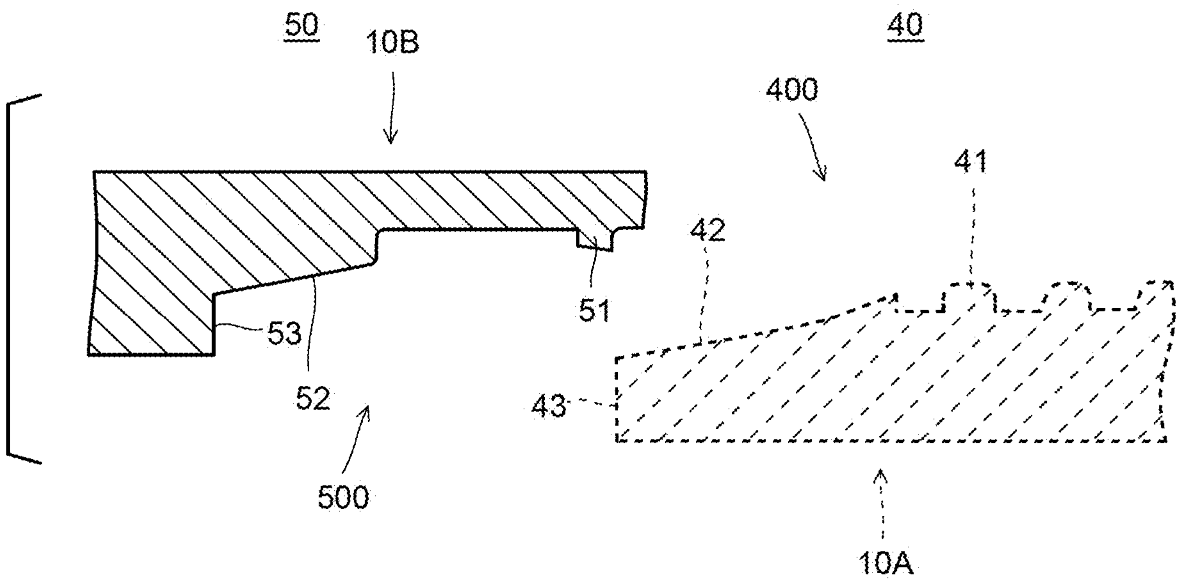
FIG. 8 is a cross-sectional view parallel to the pipe axis direction of the oil-well metal pipe illustrated in FIG. 6, illustrating a portion in the vicinity of a box of the oil-well metal pipe.

FIG. 8 is a cross-sectional view of a portion in the vicinity of the box 50 of the oil-well metal pipe 1 illustrated in FIG. 6, that is a cross-sectional view parallel to the pipe axis direction of the oil-well metal pipe 1. A dashed line portion in FIG. 8 represents the structure of the pin 40 of another oil-well metal pipe 1 in the case of fastening the oil-well metal pipe 1 to another oil-well metal pipe 1. Referring to FIG. 8, the box 50 includes a box contact surface 500 on the inner peripheral surface of the second end portion 10B of the pipe main body 10. When performing fastening to another oil-well metal pipe 1, the box contact surface 500 contacts the pin contact surface 400 of the pin 40 of the other oil-well metal pipe 1 when the pin 40 is screwed into the box 50.

The box contact surface 500 includes at least an internal thread part 51 formed in the inner peripheral surface of the second end portion 10B. When performing fastening, the internal thread part 51 engages with the external thread part 41 of the pin 40 of the other oil-well metal pipe 1.

The box contact surface 500 may further include the box sealing surface 52 and the box shoulder surface 53. In FIG. 8, on the inner peripheral surface of the second end portion 10B, the box sealing surface 52 is disposed further on the pipe main body 10 side than the internal thread part 51. In other words, the box sealing surface 52 is disposed between the internal thread part 51 and the box shoulder surface 53. The box sealing surface 52 is provided in a tapered shape. Specifically, the internal diameter of the box sealing surface 52 gradually decreases from the internal thread part 51 toward the box shoulder surface 53 in the longitudinal direction (pipe axis direction) of the second end portion 10B.

When performing fastening to another oil-well metal pipe 1, the box sealing surface 52 contacts the pin sealing surface 42 of the pin 40 of the other oil-well metal pipe 1. More specifically, during fastening, when the pin 40 of the other oil-well metal pipe 1 is screwed into the box 50, the box sealing surface 52 contacts the pin sealing surface 42, and when the pin 40 is screwed in further, the box sealing surface 52 closely contacts the pin sealing surface 42. By this means, during fastening, the box sealing surface 52 closely contacts the pin sealing surface 42 to thereby form a seal that is based on metal-to-metal contact. Therefore, the gastightness can be increased in each of the oil-well metal pipe 1 that are fastened to each other.

The box shoulder surface 53 is disposed further on the pipe main body 10 side than the box sealing surface 52. In other words, in the box 50, the box shoulder surface 53, the box sealing surface 52 and the internal thread part 51 are disposed sequentially in that order from the center of the pipe main body 10 toward the front end of the second end portion 10B. When performing fastening to another oil-well metal pipe 1, the box shoulder surface 53 opposes and contacts the pin shoulder surface 43 of the pin 40 of the other oil-well metal pipe 1. More specifically, during fastening, the box shoulder surface 53 contacts the pin shoulder surface 43 as a result of the pin 40 of the other oil-well metal pipe 1 being inserted into the box 50. By this means, during fastening, a high torque can be obtained. Further, the positional relation between the pin 40 and the box 50 in the fastening state can be stabilized.

The box contact surface 500 includes at least the internal thread part 51. When performing fastening, the internal thread part 51 of the box contact surface 500 of the box 50 contacts the external thread part 41 of the pin contact surface 400 of the pin 40 in a manner such that the internal thread part 51 corresponds to the external thread part 41. The box sealing surface 52 contacts the pin sealing surface 42 in a manner such that the box sealing surface 52 corresponds to the pin sealing surface 42. The box shoulder surface 53 contacts the pin shoulder surface 43 in a manner such that the box shoulder surface 53 corresponds to the pin shoulder surface 43.

In a case where the pin contact surface 400 includes the external thread part 41 and does not include the pin sealing surface 42 and the pin shoulder surface 43, the box contact surface 500 includes the internal thread part 51 and does not include the box sealing surface 52 and the box shoulder surface 53. In a case where the pin contact surface 400 includes the external thread part 41 and the pin shoulder surface 43 and does not include the pin sealing surface 42, the box contact surface 500 includes the internal thread part 51 and the box shoulder surface 53 and does not include the box sealing surface 52. In a case where the pin contact surface 400 includes the external thread part 41 and the pin sealing surface 42 and does not include the pin shoulder surface 43, the box contact surface 500 includes the internal thread part 51 and the box sealing surface 52 and does not include the box shoulder surface 53.

The pin contact surface 400 may include a plurality of the external thread parts 41, may include a plurality of the pin sealing surfaces 42, and may include a plurality of the pin shoulder surfaces 43. For example, the pin shoulder surface 43, the pin sealing surface 42, the external thread part 41, the pin sealing surface 42, the pin shoulder surface 43, the pin sealing surface 42 and the external thread part 41 may be disposed in that order on the pin contact surface 400 of the pin 40 in the direction from the front end of the first end portion 10A toward the center of the pipe main body 10. In such case, the internal thread part 51, the box sealing surface 52, the box shoulder surface 53, the box sealing surface 52, the internal thread part 51, the box sealing surface 52 and the box shoulder surface 53 are disposed in that order on the box contact surface 500 of the box 50 in the direction from the front end of the second end portion 10B toward the center of the pipe main body 10.

Figure 9:
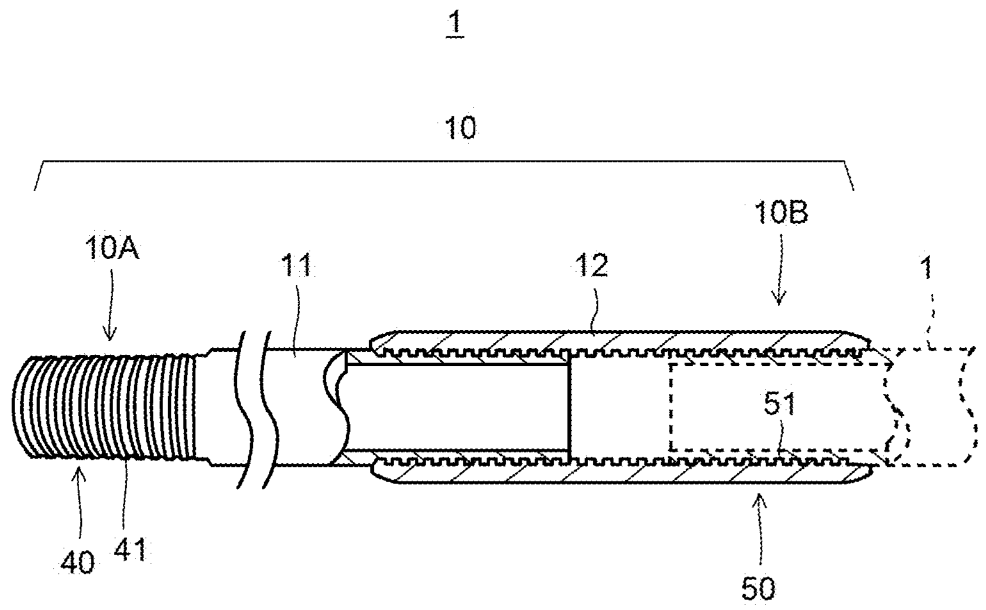
FIG. 9 is a view illustrating an example of an oil-well metal pipe in which the pin includes an external thread part but does not include a pin sealing surface and a pin shoulder surface, and the box includes an internal thread part but does not include a box sealing surface and a box shoulder surface.

In FIG. 7 and FIG. 8 a so-called "premium joint" is illustrated in which the pin 40 includes the external thread part 41, the pin sealing surface 42 and the pin shoulder surface 43, and the box 50 includes the internal thread part 51, the box sealing surface 52 and the box shoulder surface 53. However, as described above, the pin 40 may include the external thread part 41 and need not include the pin sealing surface 42 and the pin shoulder surface 43. In this case, the box 50 includes the internal thread part 51 and does not include the box sealing surface 52 and the box shoulder surface 53. FIG. 9 is a view illustrating one example of the oil-well metal pipe 1 in which the pin 40 includes the external thread part 41 and does not include the pin sealing surface 42 and the pin shoulder surface 43, and the box 50 includes the internal thread part 51 and does not include the box sealing surface 52 and the box shoulder surface 53.

[Case where Oil-Well Metal Pipe 1 is Integral Type]

The oil-well metal pipe 1 illustrated in FIG. 5, FIG. 6 and FIG. 9 is a so-called "T&C type" oil-well metal pipe 1, in which the pipe main body 10 includes the pin tube body 11 and the coupling 12. However, the oil-well metal pipe 1 according to the present embodiment may be an integral type instead of a T&C type.

Figure 10:
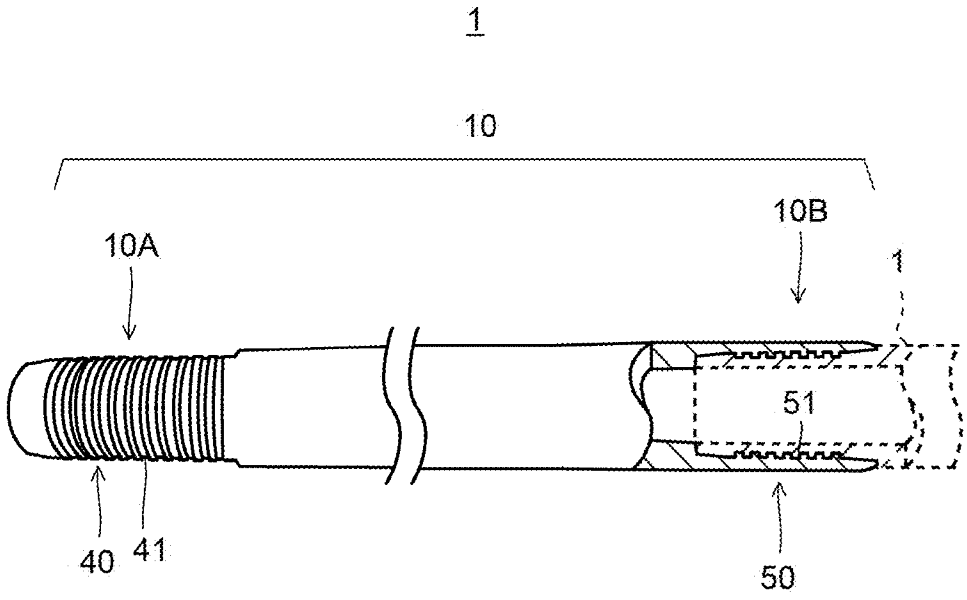
FIG. 10 is a configuration diagram illustrating an integral type oil-well metal pipe according to the present embodiment.

FIG. 10 is a configuration diagram of an integral type oil-well metal pipe 1 according to the present embodiment. Referring to FIG. 10, the integral type oil-well metal pipe 1 includes a pipe main body 10. The pipe main body 10 includes a first end portion 10A and a second end portion 10B. The first end portion 10A is disposed on the opposite side to the second end portion 10B. As described above, in the T&C type oil-well metal pipe 1, the pipe main body 10 includes the pin tube body 11 and the coupling 12. In other words, in the T&C type oil-well metal pipe 1, the pipe main body 10 is constituted by fastening two separate members (the pin tube body 11 and the coupling 12). In contrast, in the integral type oil-well metal pipe 1, the pipe main body 10 is formed in an integral manner.

The pin 40 is formed at the first end portion 10A of the pipe main body 10. When performing fastening, the pin 40 is inserted in and screwed into the box 50 of another integral type oil-well metal pipe 1, and thereby fastened to the box 50 of the other integral type oil-well metal pipe 1. The box 50 is formed at the second end portion 10B of the pipe main body 10. When performing fastening, the pin 40 of another integral type the oil-well metal pipe 1 is inserted in and screwed into the box 50, to thereby fasten the box 50 to the pin 40 of the other integral type oil-well metal pipe 1.

The structure of the pin 40 of the integral type oil-well metal pipe 1 is the same as the structure of the pin 40 of the T&C type oil-well metal pipe 1 illustrated in FIG. 7. Similarly, the structure of the box 50 of the integral type oil-well metal pipe 1 is the same as the structure of the box 50 of the T&C type oil-well metal pipe 1 illustrated in FIG. 8. Note that, in FIG. 7 and FIG. 8, the pin shoulder surface 43, the pin sealing surface 42 and the external thread part 41 in the pin 40 are disposed in that order from the front end of the first end portion 10A toward the center of the pipe main body 10. Therefore, the internal thread part 51, the box sealing surface 52 and the box shoulder surface 53 in the box 50 are disposed in that order from the front end of the second end portion 10B toward the center of the pipe main body 10. However, similarly to the pin contact surface 400 of the pin 40 of the T&C type oil-well metal pipe 1, it suffices that the pin contact surface 400 of the pin 40 of the integral type oil-well metal pipe 1 includes at least the external thread part 41. Further, similarly to the box contact surface 500 of the box 50 of the T&C type oil-well metal pipe 1, it suffices that the box contact surface 500 of the box 50 of the integral type oil-well metal pipe 1 includes at least the internal thread part 51.

The oil-well metal pipe 1 of the present embodiment may be a T&C type or may be an integral type.

[Resin Coating 100]

Figure 11:
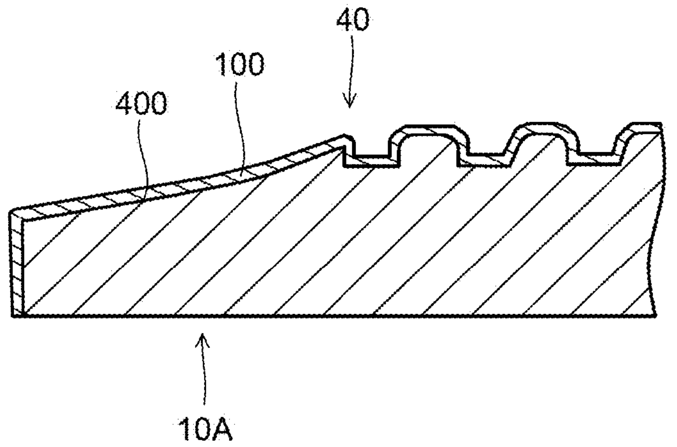
FIG. 11 is an enlarged view of a pin contact surface illustrated in FIG. 7.
Figure 12:
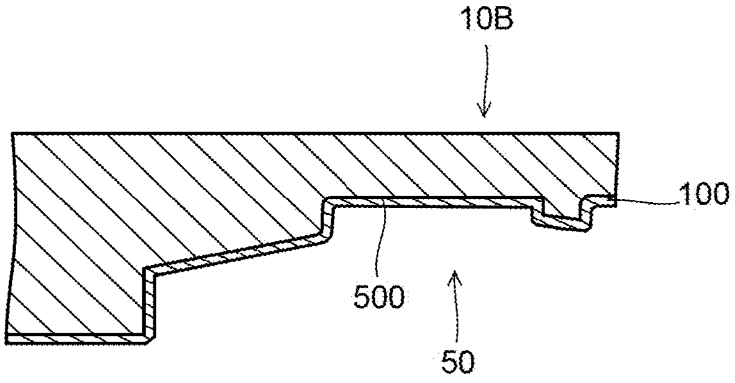
FIG. 12 is an enlarged view of a box contact surface illustrated in FIG. 8.

The oil-well metal pipe 1 of the present embodiment includes a resin coating 100 formed as an uppermost layer on the pin contact surface 400 and/or on the box contact surface 500. FIG. 11 is an enlarged view of the pin contact surface 400 illustrated in FIG. 7. FIG. 12 is an enlarged view of the box contact surface 500 illustrated in FIG. 8. As illustrated in FIG. 11 and FIG. 12, the oil-well metal pipe 1 according to the present embodiment may include the resin coating 100 as the uppermost layer on both the pin contact surface 400 and the box contact surface 500. However, a configuration may also be adopted in which the oil-well metal pipe 1 according to the present embodiment includes the resin coating 100 as the uppermost layer on only one surface among the pin contact surface 400 and the box contact surface 500. For example, in a case where the resin coating 100 is provided on or above the pin contact surface 400 as illustrated in FIG. 11, the resin coating 100 need not be provided on or above the box contact surface 500. Further, in a case where the resin coating 100 is provided on or above the box contact surface 500 as illustrated in FIG. 12, the resin coating 100 need not be provided on or above the pin contact surface 400. In other words, the oil-well metal pipe 1 according to the present embodiment includes the resin coating 100 as the uppermost layer on at least one of the pin contact surface 400 and the box contact surface 500.

[Composition of Resin Coating 100]

The resin coating 100 has the following composition.

Base material resin: 40.0 to 99.4 mass % in total

The base resin is the base material of the resin coating 100. The base resin is one or more types selected from the group consisting of epoxy resin, phenol resin, acrylic resin, urethane resin, polyester resin, polyamide-imide resin, polyimide resin, and polyether ether ketone resin. These base resins have a moderate hardness and, in addition, include therein many functional groups that form hydrogen bonds with hydrogen (H) in nylon. Therefore, these base resins increase attractive interactions in the resin coating 100 and raise the shear strength of the resin coating 100. If the total content of the base resin is less than 40.0 mass %, the hardness of the resin coating 100 will decrease and, in addition, it will not be possible to raise the shear strength of the resin coating 100. On the other hand, if the content of the base resin is more than 99.4 mass %, a sufficient amount of other components including nylon and $TiO_2$ cannot be contained, and therefore there is a possibility that the galling resistance and yield torque of the oil-well metal pipe 1 will decrease. Therefore, the total content of the base resin is within the range of 40.0 to 99.4 mass %. In a case where a plurality of types of the base resin are included, the term "total content of the base resin" means the total content of all the base resins.

A preferable lower limit of the total content of the base resin is 42.0 mass %, more preferably is 50.0 mass %, more preferably is 55.0 mass %, more preferably is 60.0 mass %, more preferably is 65.0 mass %, and further preferably is 70.0 mass %.

A preferable upper limit of the total content of the base resin is 95.0 mass %, more preferably is 90.0 mass %, more preferably is 88.0 mass %, and more preferably is 87.0 mass %.

Nylon: 0.1 to 20.0 mass %

It is considered that nylon contributes to hydrogen bond formation between hydrogen (H) in the nylon and functional groups in the base resin, and raises the shear strength of the resin coating 100. If the content of nylon is less than 0.1 mass %, the aforementioned effect cannot be obtained. On the other hand, if the content of nylon is more than 20.0 mass %, the content of other components cannot be sufficiently secured. In such a case, there is a possibility that defects will occur in the formation of the resin coating 100, or a reduction in the galling resistance and yield torque of the resin coating 100 will occur. Therefore, the content of nylon is within the range of 0.1 to 20.0 mass %.

A preferable lower limit of the content of nylon is 0.3 mass %, more preferably is 0.5 mass %, more preferably is 0.8 mass %, more preferably is 1.0 mass %, more preferably is 2.0 mass %, more preferably is 2.5 mass %, more preferably is 3.0 mass %, more preferably is 4.0 mass %, and more preferably is 5.0 mass %.

A preferable upper limit of the content of nylon is 19.0 mass %, more preferably is 17.0 mass %, and more preferably is 15.0 mass %.

$TiO_2$: 0.5 to 30.0 mass %

Titanium dioxide ($TiO_2$) increases the shear strength of the resin coating 100. $TiO_2$ is a powder. Polar groups including titanium and hydroxyl groups are exposed on the surface of the $TiO_2$. Therefore, $TiO_2$ easily forms hydrogen bonds with hydrogen (H) in the nylon and functional groups in the base resin. It is considered that by $TiO_2$ forming hydrogen bonds within the nylon and the base resin, the shear strength of the resin coating 100 increases. If the content of $TiO_2$ is less than 0.5 mass %, the aforementioned effect cannot be obtained. On the other hand, if the content of $TiO_2$ is more than 30.0 mass %, it will promote abrasive wear, and there is a possibility that the galling resistance of the oil-well metal pipe 1 will decrease. Therefore, the content of $TiO_2$ is within the range of 0.5 to 30.0 mass %.

A preferable lower limit of the content of $TiO_2$ is 0.7 mass %, more preferably is 1.0 mass %, and more preferably is 1.2 mass %.

A preferable upper limit of the content of $TiO_2$ is 28.0 mass %, more preferably is 26.0 mass %, more preferably is 25.0 mass %, more preferably is 23.0 mass % and more preferably is 21.0 mass %.

Magnesium silicate hydroxide: 0 to 49.4 mass %

Magnesium silicate hydroxide is an optional component, and it need not be contained. In other words, the content of magnesium silicate hydroxide may be 0 mass %. The hydrous magnesium silicate is a powder. When contained, that is, when the content of magnesium silicate hydroxide is more than 0 mass %, the magnesium silicate hydroxide further increases the shear strength of the resin coating 100. Polar groups including magnesium and hydroxyl groups are exposed on the surface of magnesium silicate hydroxide. Therefore, magnesium silicate hydroxide easily forms electrostatic interactions and hydrogen bonds with hydrogen (H) in the nylon and functional groups in the base resin. It is considered that by the magnesium silicate hydroxide forming hydrogen bonds within the nylon and the base resin, the shear strength of the resin coating 100 increases. If even a small amount of magnesium silicate hydroxide is contained, the aforementioned effect is obtained to a certain extent.

On the other hand, if the content of the magnesium silicate hydroxide is more than 49.4 mass %, defects will occur in the formation of the resin coating 100. Therefore, the content of magnesium silicate hydroxide is within the range of 0 to 49.4 mass %.

A preferable lower limit of the content of magnesium silicate hydroxide is 0.1 mass %, more preferably is 0.3 mass %, more preferably is 5.0 mass %, more preferably is 7.0 mass %, and further preferably is 10.0 mass %.

A preferable upper limit of the content of magnesium silicate hydroxide is 45.0 mass %, more preferably is 42.0 mass %, more preferably is 40.0 mass %, more preferably is 35.0 mass %, and further preferably is 30.0 mass %.

Wax: 0 to 10.0 mass %

The type of wax contained in the resin coating 100 according to the present embodiment is not particularly limited. The wax is, for example, one or more types selected from a group consisting of animal waxes, vegetable waxes, mineral waxes, and synthetic waxes. Preferably, the wax is one or more types selected from a group consisting of bees wax, spermaceti wax, (the foregoing are animal waxes), Japan wax, carnauba wax, candelilla wax and rice wax (the foregoing are vegetable waxes), paraffin wax, microcrystalline wax, petrolatum, montan wax, ozocerite and ceresin (the foregoing are mineral waxes), oxidized wax, polyethylene wax, polypropylene wax, Fischer-Tropsch wax, amide wax and hydrogenated castor oil (castor wax) (the foregoing are synthetic waxes). More preferably, the wax is one or more types selected from the group consisting of polyethylene wax and polypropylene wax. The resin coating 100 may contain a plurality of types of wax. In a case where the resin coating 100 contains a plurality of types of wax, the content of wax is the total content of the plurality of types of wax.

Wax is a component that is optionally contained, and it need not be contained. That is, the content of wax may be 0 mass %. When contained, that is, when the content of wax is more than 0 mass %, wax increases the lubricity of the resin coating 100. If even a small amount of wax is contained, the aforementioned effect is obtained to a certain extent.

On the other hand, if the content of wax is more than 10.0 mass %, the hardness of the resin coating 100 will decrease, and furthermore, the resin will become brittle because the base material proportion will decrease, and the resin coating 100 will easily peel off when fastening and loosening are repeated. Therefore, the content of wax is within a range of 0 to 10.0 mass %.

A preferable lower limit of the content of wax is 0.1 mass %, more preferably is 0.5 mass %, more preferably is 0.8 mass %, more preferably is 1.0 mass %, and more preferably is 2.0 mass %.

A preferable upper limit of the content of wax is 9.0 mass %, more preferably is 8.0 mass %, and more preferably is 7.5 mass %.

Fluorine-based additive: 0 to 30.0 mass %

In the present description, additives containing fluorine are referred to collectively as "fluorine-based additive". The fluorine-based additive is, for example, one type or two types selected from the group consisting of perfluoropolyether (PFPE) and polytetrafluoroethylene (PTFE). The resin coating 100 may contain a plurality of types of fluorine-based additive. In a case where the resin coating 100 contains a plurality of types of fluorine-based additive, the content of the fluorine-based additive is the total content of the plurality of types of fluorine-based additive.

In the present embodiment, a fluorine-based additive is a component that is optionally contained, and it need not be contained. That is, the content of the fluorine-based additive may be 0 mass %. When contained, that is, when the content of the fluorine-based additive is more than 0 mass %, the fluorine-based additive increases the lubricity of the resin coating 100. If even a small amount of the fluorine-based additive is contained, the aforementioned effect is obtained to a certain extent.

On the other hand, if the content of the fluorine-based additive is more than 30.0 mass %, the hardness of the resin coating 100 will decrease and the resin coating 100 will become brittle. Consequently, the resin coating 100 will easily peel off when fastening and loosening are repeated. Therefore, the content of the fluorine-based additive is within a range of 0 to 30.0 mass %.

A preferable lower limit of the content of the fluorine-based additive is 0.1 mass %, more preferably is 0.5 mass %, more preferably is 1.0 mass %, more preferably 2.0 mass %, more preferably is 3.0 mass %, more preferably is 4.5 mass %, more preferably is 5.0 mass %, and more preferably is 7.5 mass %.

A preferable upper limit of the content of the fluorine-based additive is 25.0 mass %, more preferably is 20.0 mass %, more preferably is 18.0 mass %, more preferably is 15.0 mass %, and more preferably is 12.5 mass %.

Graphite: 0 to 10.0 mass %

In the present embodiment, graphite is a component that is optionally contained, and it need not be contained. That is, the content of graphite may be 0 mass %. When contained, that is, when the content of graphite is more than 0 mass %, graphite increases the lubricity of the resin coating 100. If even a small amount of graphite is contained, the aforementioned effect is obtained to a certain extent.

On the other hand, if the content of graphite is more than 10.0 mass %, the hardness of the resin coating 100 will decrease and the resin coating 100 will become brittle. Consequently, the resin coating 100 will easily peel off when fastening and loosening are repeated. Therefore, the content of graphite is within a range of 0 to 10.0 mass %.

A preferable lower limit of the content of graphite is 0.1 mass %, more preferably is 0.5 mass %, more preferably is 0.8 mass %, more preferably is 1.0 mass %, more preferably is 2.0 mass %, and more preferably is 3.0 mass %.

A preferable upper limit of the content of graphite is 9.0 mass %, more preferably is 8.0 mass %, more preferably is 7.0 mass %, and more preferably is 6.0 mass %.

Rust preventive pigment: 0 to 30.0 mass %

In the present embodiment, the rust preventive pigment is not particularly limited as long as it is a well-known pigment that increases the anti-rust properties of the resin coating 100. The rust preventive pigment is, for example, one or more types selected from a group consisting of zinc phosphate, aluminum tripolyphosphate, aluminum phosphite, a metal soap of a carboxylic acid, and a sulfonate. The resin coating 100 may contain a plurality of types of rust preventive pigment. In a case where the resin coating 100 contains a plurality of types of rust preventive pigment, the term "content of the rust preventive pigment" means the total content of the plurality of types of rust preventive pigment.

In the present embodiment, a rust preventive pigment is a component that is optionally contained, and it need not be contained. That is, the content of the rust preventive pigment may be 0 mass %. When contained, that is, when the content of the rust preventive pigment is more than 0 mass %, the rust preventive pigment increases the anti-rust properties of the resin coating 100. If even a small amount of rust preventive pigment is contained, the aforementioned effect is obtained to a certain extent.

On the other hand, if the content of the rust preventive pigment is more than 30.0 mass %, defects will occur in the formation of the resin coating 100. Therefore, the content of the rust preventive pigment is within a range of 0 to 30.0 mass %.

A preferable lower limit of the content of the rust preventive pigment is 1.0 mass %, more preferably is 1.5 mass %, further preferably is 2.0 mass %, more preferably is 3.0 mass %, and more preferably is 3.5 mass %.

A preferable upper limit of the content of the rust preventive pigment is 25.0 mass %, more preferably is 20.0 mass %, and further preferably is 10.0 mass %.

Coloring pigment: 0 to 10.0 mass %

In the present embodiment, the coloring pigment is not particularly limited as long as it is a well-known pigment which can color the resin coating 100. The coloring pigment is, for example, one or more types selected from a group consisting of copper phthalocyanine, zinc oxide, yellow iron oxide, iron oxide, and chromium hydroxide. The resin coating 100 may contain a plurality of types of coloring pigment. In a case where the resin coating 100 contains a plurality of types of coloring pigment, the content of the coloring pigment is the total content of the plurality of types of coloring pigment.

In the present embodiment, a coloring pigment is a component that is optionally contained, and it need not be contained. That is, the content of the coloring pigment may be 0 mass %. When contained, that is, when the content of the coloring pigment is more than 0 mass %, the coloring pigment colors the resin coating 100. As a result, visual recognition of damage to the resin coating 100 is facilitated. If even a small amount of coloring pigment is contained, the aforementioned effect is obtained to a certain extent.

On the other hand, if the content of the coloring pigment is more than 10.0 mass %, defects will occur in the formation of the resin coating 100. Therefore, the content of the coloring pigment is within a range of 0 to 10.0 mass %.

A preferable lower limit of the content of the coloring pigment is 0.1 mass %, more preferably is 0.2 mass %, more preferably is 0.5 mass % and preferably is 0.8 mass %.

A preferable upper limit of the content of the coloring pigment is 8.0 mass %, more preferably is 5.0 mass %, more preferably is 3.0 mass %, and more preferably is 2.0 mass %.

Coupling agent: 0 to 10.0 mass %

In the present embodiment, the coupling agent is not particularly limited. The coupling agent is, for example, one type or two types selected from the group consisting of a silane coupling agent and a titanium coupling agent. The resin coating 100 may contain a plurality of types of coupling agent. In a case where the resin coating 100 contains a plurality of types of coupling agent, the content of the coupling agent is the total content of the plurality of types of coupling agent.

In the present embodiment, a coupling agent is a component that is optionally contained, and it need not be contained. That is, the content of the coupling agent may be 0 mass %. When contained, that is, when the content of the coupling agent is more than 0 mass %, the coupling agent increases the adhesiveness of the resin coating 100. Therefore, during repeated fastening and loosening of the oil-well metal pipe 1, the coupling agent suppresses delamination of the resin coating 100. If even a small amount of coupling agent is contained, the aforementioned effect is obtained to a certain extent.

On the other hand, if the content of the coupling agent is more than 10.0 mass %, defects will occur in the formation of the resin coating 100. Therefore, the content of the coupling agent is within a range of 0 to 10.0 mass %.

A preferable lower limit of the content of the coupling agent is 0.1 mass %, more preferably is 0.2 mass %, more preferably is 0.5 mass %, more preferably is 0.7 mass %, and more preferably is 1.0 mass %.

A preferable upper limit of the content of the coupling agent is 8.0 mass %, more preferably is 6.0 mass %, more preferably is 5.0 mass %, and more preferably is 4.0 mass %.

The resin coating 100 may consist of the composition described above or may consist of the composition described above and the balance consists of 0 to 1.0 mass % impurities.

[Shear Material Ratio]

In the resin coating 100 of the present embodiment, a ratio of the total content in mass % of a wax, a fluorine-based additive and graphite to the total content in mass % of nylon, $TiO_2$ and magnesium silicate hydroxide is 5.00 or less. Hereinafter, the ratio of the total content in mass % of a wax, a fluorine-based additive and graphite to the total content of nylon, $TiO_2$ and magnesium silicate hydroxide is also referred to as "shear material ratio".

As described above, it is considered that a wax, a fluorine-based additive, and graphite do not contribute to an increase in shear force caused by an increase in attractive interactions in the resin coating 100. If the total content of a wax, a fluorine-based additive and graphite is too large with respect to the total content of nylon, $TiO_2$ and magnesium silicate hydroxide, attractive interactions will not sufficiently increase and the shear strength of the resin coating 100 will not be raised. Therefore, on the premise of having the aforementioned composition, the shear material ratio of the resin coating 100 is 5.00 or less.

The upper limit of the shear material ratio is preferably 4.50, more preferably is 4.00, more preferably is 3.50, more preferably is 3.00, and more preferably is 2.90. Although a lower limit of the shear material ratio is not particularly limited, for example the lower limit is 0.00, and for example 0.10.

By having the aforementioned composition and the shear material ratio being 5.00 or less, the shear strength of the resin coating 100 increases. As a result, the yield torque of the oil-well metal pipe 1 including the resin coating 100 increases.

[Ratio Between Base Resin and Nylon]

Preferably, the ratio of the content in mass % of the nylon to the total content in mass % of the base resin is 0.30 or less. As described above, by hydrogen bonds being formed between hydrogen (H) in the nylon and functional groups in the base resin, and attractive interactions increasing, the shear strength of the resin coating 100 increases. If the ratio of the content of nylon to the total content of the base resin is 0.30 or less, the number of functional groups will increase and consequently formation of hydrogen bonds in the resin coating 100 will be further promoted. As a result, the shear strength of the resin coating 100 will further increase.

The upper limit of the ratio of the content of nylon to the total content of the base resin is more preferably 0.25, more preferably is 0.20, more preferably is 0.18, and more preferably is 0.15. Although the lower limit of the ratio of the content of nylon to the total content of the base resin is not particularly limited, for example the lower limit is 0.01. The lower limit of the ratio of the content of nylon to the total content of the base resin is preferably 0.02, and more preferably is 0.03.

[Shear Strength]

Although the shear strength of the resin coating 100 is not particularly limited, the higher the shear strength is, the more preferable it is. If the shear strength of the resin coating 100 is 58.0 MPa or more, the yield torque of the oil-well metal pipe 1 that includes the resin coating 100 can be more stably raised. Therefore, the shear strength of the resin coating 100 is preferably 58.0 MPa or more. A further preferable lower limit of the shear strength of the resin coating 100 is 58.5 MPa, and more preferably is 59.0 MPa. Whilst the upper limit of the shear strength of the resin coating 100 is not particularly limited, for example, the upper limit is 70.0 MPa.

[Method for Measuring Shear Strength]

The shear strength of the resin coating 100 can be measured by the following method. A test specimen is cut out from the oil-well metal pipe 1 that includes the resin coating 100. The size of the test specimen is, for example, 10 mm×10 mm on the surface and 10 mm thick. However, the size of the test specimen is not limited, for example, the surface of the specimen may be 30 mm×30 mm. The surface of the test specimen is coated with a resin coating 100. The surface of the test specimen corresponds to the contact surface 400 or 500 of the oil-well metal pipe 1 on which the resin coating 100 is formed.

The shear strength of the obtained test specimen is determined using a surface and interfacial cutting analysis system (manufactured by DAIPLA WINTES CO., LTD; product name: SAICAS). Using a cutting blade with a blade width of 1 mm, the surface of the resin coating 100 is cut diagonally at an angle of 10° under a constant speed (horizontal speed of 2 m/see, vertical speed of 0.2 m/sec) to cause the resin coating 100 to peel off from the contact surfaces 400 and 500. Note that, the test is conducted entirely at room temperature (25±5° C.). When the surface of the test specimen is curved, the direction of the shear strength measurement at the surface of the test specimen is perpendicular to the direction of the curvature of the test specimen (that is, the pipe axis direction of the oil-well metal pipe 1). At such time, the shear strength (MPa) of the resin coating 100 is determined based on the horizontal force and vertical force applied to the cutting blade and also the vertical displacement.

[Thickness of Resin Coating 100]

In the present embodiment, the thickness of the resin coating 100 is not particularly limited. The thickness of the resin coating 100 is, for example, 1 to 100 μm. In this case, the yield torque of the oil-well metal pipe 1 can be more stably increased. The lower limit of the thickness of the resin coating 100 is preferably 2 μm, further preferably is 5 μm, and further preferably is 10 μm. The upper limit of the thickness of the resin coating 100 is preferably 50 m, further preferably is 40 μm, and further preferably is 30 μm.

[Method for Measuring Thickness of Resin Coating 100]

The thickness of the resin coating 100 can be measured by the following method. A probe of an electromagnetic induction type film thickness measuring instrument is brought into contact with the pin contact surface 400 or the box contact surface 500 on which the resin coating 100 is formed. The probe has an electromagnet, and when a magnetic body is brought close to it, electromagnetic induction occurs, and its voltage changes depending on the distance between the probe and the magnetic body. The thickness of the resin coating 100 is determined from the change in voltage amount. The measurement locations are twelve locations (twelve locations that are at 0°, 30°, 60°, 90°, 120°, 150°, 180°, 210°, 240°, 270°, 3000 and 330°) in the tube circumferential direction of the oil-well metal pipe 1. The arithmetic mean value of the measurement results for the twelve locations is taken to be the thickness of the resin coating 100.

[Other Layers]

The oil-well metal pipe 1 may be provided with other layers between the pin contact surface 400 and/or the box contact surface 500 and the resin coating 100, which is the uppermost layer. For example, the oil-well metal pipe 1 may be provided with other layers below the resin coating 100, which is the uppermost layer, i.e., between the pin contact surface 400 and the resin coating 100. For example, the oil-well metal pipe 1 may be provided with other layers below the resin coating 100, which is the uppermost layer, i.e., between the box contact surface 500 and the resin coating 100.

Other layer is, for example, one or more chemical conversion coatings and/or one or more plating layers. More specifically, the other layer is, for example, one or more selected from the group consisting of a phosphate coating, a plating layer, a chromate coating, and a zirconium coating. The phosphate coating is, for example, one or more selected from the group consisting of a zinc phosphate coating, a manganese phosphate coating, a calcium phosphate coating, and an iron phosphate coating. The plating layer is, for example, one or more selected from the group consisting of a Zn plating layer, a Ni plating layer, a Cu plating layer, a Zn—Ni alloy plating layer, a Zn—Co alloy plating layer, and a Ni—W alloy plating layer. When the plating layer is the Zn—Ni alloy plating layer, the chemical composition of the Zn—Ni alloy plating layer contains, for example, 10 to 20 mass % Ni and the remainder Zn and impurities. If the plating layer is the Cu plating layer, the chemical composition of the Cu plating layer contains, for example, Cu and impurities. A plurality of other layers may be stacked in the radial direction of the oil-well metal pipe 1. For example, the plating layer may be disposed on the pin contact surface 400, the chromate coating may be disposed on the plating layer, and the resin coating 100 of an uppermost layer may be disposed on the chromate coating.

[Chemical Composition of Pipe Main Body 10]

The chemical composition of the pipe main body 10 of the oil-well metal pipe 1 according to the present embodiment is not particularly limited. That is, in the present embodiment, the steel type of the pipe main body 10 of the oil-well metal pipe 1 is not particularly limited. The pipe main body 10 may be formed of, for example, carbon steel, stainless steel, an alloy or the like. That is, the oil-well metal pipe 1 may be a pipe composed of an Fe-based alloy, or may be an alloy pipe as typified by an Ni-based alloy pipe. Here, the pipe is, for example, a low-alloy steel pipe, a martensitic stainless steel pipe, a duplex stainless steel pipe or the like. On the other hand, among alloys, high alloys such as an Ni-based alloy and duplex stainless steels that contain alloying elements such as Cr, Ni and Mo have high corrosion resistance. Therefore, by using these high alloys as the pipe main body 10, excellent corrosion resistance is obtained in a corrosive environment that contains hydrogen sulfide or carbon dioxide or the like.

[Production Method]

A method for producing the oil-well metal pipe 1 according to the present embodiment will be described hereunder.

The method for producing the oil-well metal pipe 1 according to the present embodiment includes a preparation process, an application process, and a hardening process. The hardening process is performed after the application process.

[Preparation Process]

In the preparation process, the oil-well metal pipe having the pipe main body 10 that includes the pin 40 including the pin contact surface 400 that includes the external thread part 41, and the box 50 including the box contact surface 500 that includes the internal thread part 51 is prepared. As described above, the oil-well metal pipe according to the present embodiment has a well-known structure. In other words, in the preparation process it suffices to prepare the oil-well metal pipe that has a well-known structure.

[Application Process]

In the application process, a composition is applied onto the pin contact surface 400 and/or onto the box contact surface 500 of the prepared oil-well metal pipe. The composition is a composition for forming the aforementioned resin coating 100. The composition contains: a base resin: 40.0 to 99.4 mass % in total, nylon: 0.1 to 20.0 mass %, $TiO_2$: 0.5 to 30.0 mass %, magnesium silicate hydroxide: 0 to 49.4 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, and a coupling agent: 0 to 10.0 mass %, in which a ratio of the total content in mass % of the wax, the fluorine-based additive and the graphite to the total content in mass % of the nylon, the $TiO_2$ and the magnesium silicate hydroxide is 5.00 or less. The composition further contains a solvent. The composition for forming the resin coating 100 is the same as the composition of the resin coating 100 described above, excluding a solvent.

The composition can be produced, for example, by melting or dispersing the base resin, the nylon, the $TiO_2$, and, as necessary, other components in the solvent and mixing them. The solvent is, for example, one or more types selected from the group consisting of water, alcohol and an organic solvent. The solvent may contain a small amount of a surfactant. The proportion of the solvent is not particularly limited. It suffices to adjust the proportion of the solvent to an appropriate viscosity according to the application method. The proportion of the solvent is, for example, within a range of 40 to 60 mass % when taking the total of all components other than the solvent as 100 mass %.

The method of applying the composition on the pin contact surface 400 and/or the box contact surface 500 is not particularly limited, and a well-known method may be used. For example, the composition in solution form is applied on the pin contact surface 400 and/or the box contact surface 500 by spray coating. In this case, the viscosity of the composition is to be adjusted so that it can be applied by spray coating in an environment at normal temperature and normal pressure. Another application method, such as brushing or dipping may be employed as the method for applying the composition on the pin contact surface 400 and/or the box contact surface 500, instead of spray application.

[Hardening Process]

In the hardening process, the applied composition is hardened to form the resin coating 100. By heating the composition that was applied onto the pin contact surface 400 and/or onto the box contact surface 500, the composition is subjected to thermal curing and the solid resin coating 100 is formed. The heating method is not particularly limited, and a well-known method may be used. The heating method is, for example, a method in which the oil-well metal pipe 1 on which the composition has been applied is inserted into a well-known heating furnace and heated. The heating temperature is, for example, 200 to 250° C., and the heating time is, for example, 5 to 30 minutes.

The oil-well metal pipe 1 according to the present embodiment is produced by the above processes. Note that, the method for producing the oil-well metal pipe 1 according to the present embodiment may include other processes.

[Preconditioning Treatment Process]

The method for producing the oil-well metal pipe 1 according to the present embodiment may further include a preconditioning treatment process prior to the application process. In the preconditioning treatment process, for example, one or more types of treatment selected from the group consisting of a pickling treatment, a blasting treatment and an alkaline degreasing treatment is performed.

In the case of performing a pickling treatment, for example, the pin contact surface 400 and/or the box contact surface 500 is immersed in a strongly acidic solution such as sulfuric acid, hydrochloric acid, nitric acid, hydrofluoric acid or a mixture of these acids, to thereby increase the surface roughness of the pin contact surface 400 and/or the box contact surface 500. In the case of performing a blasting treatment, for example, sand blasting is performed in which a blast material (an abrasive) is mixed with compressed air, and the mixture is propelled onto the pin contact surface 400 and/or the box contact surface 500. In this case, the surface roughness of the pin contact surface 400 and/or the box contact surface 500 increases.

Note that, in the preconditioning treatment process, the pin contact surface 400 and the box contact surface 500 may be subjected to the same processes or may be subjected to different processes to each other. Further, the preconditioning treatment process may be performed only on the pin contact surface 400, or may be performed only on the box contact surface 500.

The oil-well metal pipe 1 according to the present embodiment is produced by the above processes. However, the production method described above is one example of a method for producing the oil-well metal pipe 1 according to the present embodiment, and the present embodiment is not limited to the production method described above. The oil-well metal pipe 1 according to the present embodiment may also be produced by another method.

EXAMPLE

The advantageous effects of the oil-well metal pipe of the present embodiment are described more specifically hereunder by way of examples. The conditions adopted in the following examples are one example of conditions which are employed for confirming the workability and advantageous effects of the oil-well metal pipe of the present embodiment. Accordingly, the oil-well metal pipe of the present embodiment is not limited to this one example of the conditions.

In the examples, compositions for forming resin coatings were prepared, and the shear strength of the respective resin coatings was evaluated. The specific details are described in the following.

Compositions having the chemical compositions shown in Table 1 were prepared. The ratio of the total content in mass % of the wax, the fluorine-based additive and the graphite to the total content in mass % of the nylon, the $TiO_2$ and the magnesium silicate hydroxide in the composition of each test number was determined. The results are shown in the "Shear Material Ratio" column in Table 1. The ratio of the content in mass % of nylon to the total content in mass % of the base resin in the composition of each test number was determined. The results are shown in the "Nylon Ratio" column in Table 1. Note that, each composition contained a solvent in addition to the chemical composition described in Table 1. A mixed solution of water, alcohol and a surfactant was used as the solvent.

TABLE 1

| Test Number | Base Resin Type | Base Resin Content (mass %) | Nylon (mass %) | $TiO_2$ (mass %) | Magnesium Silicate Hydroxide (mass %) | Wax (mass %) | Fluorine-Based Additive (mass %) | Graphite (mass %) | Rust Preventive Rust Pigment (mass %) | Coloring Pigment (mass %) | Coupling Agent (mass %) | Shear Material Ratio | Nylon Ratio | Shear Strength (MPa) |
|---|---|---|---|---|---|---|---|---|---|---|---|---|---|---|
| 1 | Epoxy | 81.8 | 5.0 | 1.5 | 0.0 | 0.0 | 0.0 | 0.0 | 7.5 | 1.0 | 3.2 | 0.00 | 0.06 | 68.0 |
| 2 | Epoxy | 77.0 | 10.0 | 1.5 | 0.0 | 0.0 | 0.0 | 0.0 | 7.5 | 1.0 | 3.0 | 0.00 | 0.13 | 61.0 |
| 3 | Epoxy | 77.0 | 5.0 | 1.5 | 5.0 | 0.0 | 0.0 | 0.0 | 7.5 | 1.0 | 3.0 | 0.00 | 0.06 | 69.0 |
| 4 | Epoxy | 72.2 | 10.0 | 1.5 | 5.0 | 0.0 | 0.0 | 0.0 | 7.5 | 1.0 | 2.8 | 0.00 | 0.14 | 68.1 |
| 5 | Epoxy | 67.9 | 15.0 | 1.5 | 5.0 | 0.0 | 0.0 | 0.0 | 7.5 | 1.0 | 2.1 | 0.00 | 0.22 | 62.4 |
| 6 | Epoxy | 86.2 | 0.1 | 1.5 | 0.0 | 0.0 | 0.0 | 0.0 | 7.5 | 1.1 | 3.6 | 0.00 | 0.00 | 65.5 |
| 7 | Epoxy | 85.4 | 1.0 | 1.5 | 0.0 | 0.0 | 0.0 | 0.0 | 7.5 | 1.1 | 3.5 | 0.00 | 0.01 | 67.2 |
| 8 | Epoxy | 84.4 | 3.0 | 0.5 | 0.0 | 0.0 | 0.0 | 0.0 | 7.5 | 1.1 | 3.5 | 0.00 | 0.04 | 65.3 |
| 9 | Epoxy | 75.3 | 3.0 | 10.0 | 0.0 | 0.0 | 0.0 | 0.0 | 7.5 | 1.1 | 3.1 | 0.00 | 0.04 | 67.1 |
| 10 | Epoxy | 65.7 | 3.0 | 20.0 | 0.0 | 0.0 | 0.0 | 0.0 | 7.5 | 1.1 | 2.7 | 0.00 | 0.05 | 61.0 |
| 11 | Epoxy | 60.9 | 3.0 | 25.0 | 0.0 | 0.0 | 0.0 | 0.0 | 7.5 | 1.1 | 2.5 | 0.00 | 0.05 | 60.5 |
| 12 | Urethane | 79.9 | 5.0 | 1.5 | 5.0 | 0.0 | 0.0 | 0.0 | 7.5 | 1.1 | 0.0 | 0.00 | 0.06 | 63.2 |
| 13 | Epoxy | 71.9 | 5.0 | 1.5 | 10.0 | 0.0 | 0.0 | 0.0 | 7.5 | 1.1 | 3.0 | 0.00 | 0.07 | 67.1 |
| 14 | Epoxy | 62.3 | 5.0 | 1.5 | 20.0 | 0.0 | 0.0 | 0.0 | 7.5 | 1.1 | 2.6 | 0.00 | 0.08 | 66.7 |
| 15 | Epoxy | 52.7 | 5.0 | 1.5 | 30.0 | 0.0 | 0.0 | 0.0 | 7.5 | 1.1 | 2.2 | 0.00 | 0.09 | 62.3 |
| 16 | Epoxy | 43.1 | 5.0 | 1.5 | 40.0 | 0.0 | 0.0 | 0.0 | 7.5 | 1.1 | 1.8 | 0.00 | 0.12 | 60.5 |
| 17 | Epoxy | 80.6 | 5.0 | 1.5 | 0.0 | 1.0 | 0.0 | 0.0 | 7.5 | 1.1 | 3.3 | 0.15 | 0.06 | 67.4 |
| 18 | Epoxy | 80.6 | 5.0 | 1.5 | 0.0 | 0.0 | 1.0 | 0.0 | 7.5 | 1.1 | 3.3 | 0.15 | 0.06 | 66.9 |
| 19 | Epoxy | 80.6 | 5.0 | 1.5 | 0.0 | 0.0 | 0.0 | 1.0 | 7.5 | 1.1 | 3.3 | 0.15 | 0.06 | 68.2 |
| 20 | Epoxy | 71.0 | 3.0 | 1.5 | 0.0 | 5.0 | 3.0 | 5.0 | 7.5 | 1.1 | 2.9 | 2.89 | 0.04 | 60.2 |
| 21 | Epoxy | 69.0 | 3.0 | 1.5 | 0.0 | 5.0 | 5.0 | 5.0 | 7.5 | 1.1 | 2.9 | 3.33 | 0.04 | 59.1 |
| 22 | Epoxy | 78.0 | 5.0 | 1.5 | 5.0 | 0.0 | 0.0 | 0.0 | 7.5 | 0.0 | 3.0 | 0.00 | 0.06 | 69.3 |
| 23 | Epoxy | 76.0 | 10.0 | 1.5 | 5.0 | 0.0 | 0.0 | 0.0 | 3.5 | 1.0 | 3.0 | 0.00 | 0.13 | 67.8 |
| 24 | Epoxy | 63.4 | 20.0 | 1.5 | 5.0 | 0.0 | 0.0 | 0.0 | 7.5 | 1.0 | 1.6 | 0.00 | 0.32 | 58.3 |
| 25 | Epoxy | 89.9 | 0.0 | 1.4 | 0.0 | 0.0 | 0.0 | 0.0 | 7.6 | 1.1 | 0.0 | 0.00 | 0.00 | 55.7 |
| 26 | Epoxy | 62.4 | 25.0 | 1.4 | 0.0 | 0.0 | 0.0 | 0.0 | 7.5 | 1.1 | 2.6 | 0.00 | 0.40 | 45.8 |
| 27 | Epoxy | 54.7 | 3.0 | 1.4 | 0.0 | 10.0 | 10.0 | 10.0 | 7.5 | 1.1 | 2.3 | 6.82 | 0.05 | 37.2 |
| 28 | Epoxy | 49.9 | 3.0 | 1.4 | 0.0 | 10.0 | 15.0 | 10.0 | 7.5 | 1.1 | 2.1 | 7.95 | 0.06 | 34.0 |
| 29 | Epoxy | 68.6 | 15.0 | 0.0 | 0.0 | 0.0 | 5.0 | 0.0 | 7.5 | 1.1 | 2.8 | 0.33 | 0.22 | 49.6 |
| 30 | Epoxy | 49.4 | 3.0 | 32.0 | 0.0 | 0.0 | 5.0 | 0.0 | 7.5 | 1.1 | 2.1 | 0.14 | 0.06 | 57.3 |

A cold-rolled steel sheet (chemical composition: C≤0.15%, Mn≤0.60%, P≤0.100%, S≤0.050%, and the balance: Fe and impurities) having a length of 30 mm, a width of 30 mm, and a thickness of 2 mm was prepared as a metal material to simulate an oil-well metal pipe. The composition of each test number was applied on the cold-rolled steel sheet. The targeted thickness of the resin coating was 20 m. The cold-rolled steel sheet onto which the composition had been applied was subjected to a heating treatment at 210° C. for 20 minutes, and thereafter was cooled, and a resin coating was formed on the cold-rolled steel sheet. The shear strength of the resin coating of each test number was measured in accordance with the [Method for measuring shear strength] described above. The surface of the test specimen was 30 mm×30 mm and 2 mm thick. The results are shown in Table 1.

Evaluation Results

Referring to Table 1, with respect to the resin coatings of Test Numbers 1 to 24, the content of each component was appropriate, and the shear material ratio was also 5.00 or less. As a result, the shear strength of each of these resin coatings was 58.0 MPa or more, and thus these resin coatings had a high shear strength.

In the resin coatings of Test Numbers 1 to 23 in which the ratio of the content in mass % of nylon to the total content in mass % of the base resin was 0.30 or less, the shear strength was 59.0 MPa or more. The resin coatings of Test Numbers 1 to 23 had even higher shear strength in comparison to Test Number 24.

On the other hand, in the resin coating of Test Number 25, the content of nylon was too low. As a result, the shear strength of the resin coating of Test Number 25 was less than 58.0 MPa, and thus the resin coating did not have a high shear strength.

In the resin coating of Test Number 26, the content of nylon was too high. As a result, the shear strength of the resin coating of Test Number 26 was less than 58.0 MPa, and thus the resin coating did not have a high shear strength.

In the resin coatings of Test Numbers 27 and 28, although the content of each component was appropriate, the shear material ratio was more than 5.00. As a result, the shear strength of the resin coatings of Test Numbers 27 and 28 was less than 58.0 MPa, and thus these resin coatings did not have a high shear strength.

In the resin coating of Test Number 29, the content of $TiO_2$ was too low. As a result, the shear strength of the resin coating of Test Number 29 was less than 58.0 MPa, and thus the resin coating did not have a high shear strength.

In the resin coating of Test Number 30, the content of $TiO_2$ was too high. As a result, the shear strength of the resin coating of Test Number 30 was less than 58.0 MPa, and thus the resin coating did not have a high shear strength.

An embodiment of the present disclosure has been described above. However, the foregoing embodiment is merely an example for implementing the present disclosure. Accordingly, the present disclosure is not limited to the above embodiment, and the above embodiment can be appropriately modified within a range which does not deviate from the gist of the present disclosure.

REFERENCE SIGNS LIST

1, 1*a*, 1*b* Oil-Well Metal Pipe
10 Pipe Main Body

10A First End Portion
10B Second End Portion
11 Pin Tube Body
12 Coupling
40 Pin
41 External Thread Part
42 Pin Sealing Surface
43 Pin Shoulder Surface
50 Box
51 Internal Thread Part
52 Box Sealing Surface
53 Box Shoulder Surface
100, 100*a*, 100*b* Resin Coating
400 Pin Contact Surface
500 Box Contact Surface

The invention claimed is:

1. An oil-well metal pipe, comprising:

a pipe main body including a first end portion and a second end portion;

wherein:

the pipe main body includes:

a pin formed at the first end portion, and a box formed at the second end portion;

the pin includes:

a pin contact surface including an external thread part; and the box includes:

a box contact surface including an internal thread part;

the oil-well metal pipe further comprising:

a resin coating formed as an uppermost layer on the pin contact surface and/or on the box contact surface;

the resin coating containing:

a base resin of one or more types selected from a group consisting of epoxy resin, phenol resin, acrylic resin, urethane resin, polyester resin, polyamide-imide resin, polyimide resin, and polyether ether ketone resin: 40.0 to 99.4 mass % in total, nylon: 0.1 to 20.0 mass %, $TiO_2$: 0.5 to 30.0 mass %, magnesium silicate hydroxide: 0 to 49.4 mass %, a wax: 0 to 10.0 mass %, a fluorine-based additive: 0 to 30.0 mass %, graphite: 0 to 10.0 mass %, a rust preventive pigment: 0 to 30.0 mass %, a coloring pigment: 0 to 10.0 mass %, and a coupling agent: 0 to 10.0 mass %;

wherein:

a ratio of a total content in mass % of the wax, the fluorine-based additive and the graphite to a total content in mass % of the nylon, the $TiO_2$ and the magnesium silicate hydroxide in the resin coating is 5.00 or less.

2. The oil-well metal pipe according to claim 1, wherein:

a ratio of a content in mass % of the nylon to a total content in mass % of the base resin is 0.30 or less.

3. The oil-well metal pipe according to claim 2, wherein:

the pin contact surface further includes a pin sealing surface and a pin shoulder surface, and the box contact surface further includes a box sealing surface and a box shoulder surface.

4. The oil-well metal pipe according to claim 1, wherein:

the pin contact surface further includes a pin sealing surface and a pin shoulder surface, and the box contact surface further includes a box sealing surface and a box shoulder surface.

* * * * *